United States Patent
Chen et al.

(10) Patent No.: US 12,513,128 B2
(45) Date of Patent: Dec. 30, 2025

(54) IN-VEHICLE NETWORK OTA SECURITY COMMUNICATION METHOD AND APPARATUS, VEHICLE-MOUNTED SYSTEM, AND STORAGE MEDIUM

(71) Applicant: Chengdu Kawa Technology Co., Ltd, Sichuan (CN)

(72) Inventors: Xi Chen, Sichuan (CN); Xuming Zheng, Sichuan (CN); Yongbo Wu, Sichuan (CN); Jianping Shuang, Sichuan (CN)

(73) Assignee: Chengdu Kawa Technology Co., Ltd, Sichuan (CN)

( * ) Notice: Subject to any disclaimer, the term of this patent is extended or adjusted under 35 U.S.C. 154(b) by 280 days.

(21) Appl. No.: 18/270,506

(22) PCT Filed: Dec. 6, 2021

(86) PCT No.: PCT/CN2021/135874
§ 371 (c)(1),
(2) Date: Jun. 30, 2023

(87) PCT Pub. No.: WO2023/087423
PCT Pub. Date: May 25, 2023

(65) Prior Publication Data
US 2024/0064134 A1    Feb. 22, 2024

(30) Foreign Application Priority Data
Nov. 18, 2021  (CN) .......................... 202111372411.X

(51) Int. Cl.
*H04L 9/40*    (2022.01)

(52) U.S. Cl.
CPC .................................. *H04L 63/08* (2013.01)

(58) Field of Classification Search
CPC ....... H04L 63/08; H04L 9/088; H04L 9/3273; H04L 9/0869; H04L 9/3242;
(Continued)

(56) References Cited

U.S. PATENT DOCUMENTS 7,694,335 B1 *  4/2010  Turner ................ H04L 63/1441
713/168
8,321,674 B2 *  11/2012  Hamada .................. H04L 9/004
713/169

(Continued)

*Primary Examiner* — Aravind K Moorthy
(74) *Attorney, Agent, or Firm* — Birchwood IP

(57) ABSTRACT

Disclosed are an in-vehicle network OTA security communication method and apparatus, a vehicle-mounted system. According to the present disclosure, the temporary key is generated through the random numbers and the root key in the in-vehicle network, integrity check is performed with the MAC value, the master node and each child node of the in-vehicle network need to be subjected to identity authentication before performing OTA service, and the OTA service may be started only after the authentication succeeds. During the service process, data that needs to be exchanged between the master node and each child node, including various commands, upgrade package content, upgrade progress transmission and other data, may be encrypted, the key for each encryption is randomly generated, and the OTA service is different each time, thereby avoiding key leakage and replay attacks, ensuring the security of in-vehicle network OTA communication.

9 Claims, 3 Drawing Sheets

(58) Field of Classification Search
CPC ....... H04L 63/068; H04L 67/06; H04L 67/12;
H04L 2209/84; H04W 12/106
See application file for complete search history.

(56) References Cited

U.S. PATENT DOCUMENTS

| | | | | |
|---|---|---|---|---|
| 8,370,644 | B2* | 2/2013 | Handschuh | G06F 21/554 713/193 |
| 8,667,265 | B1* | 3/2014 | Hamlet | H04L 9/3278 713/185 |
| 8,868,913 | B1* | 10/2014 | Watsen | H04L 63/0823 709/227 |
| 9,317,688 | B2* | 4/2016 | Yegin | H04W 4/50 |
| 9,455,984 | B2* | 9/2016 | Jo | G06F 21/32 |
| 9,628,488 | B1* | 4/2017 | Desai | H04L 9/3228 |
| 9,697,371 | B1* | 7/2017 | Willden | G06F 21/62 |
| 9,736,125 | B2* | 8/2017 | Zhang | H04W 88/10 |
| 9,954,859 | B2* | 4/2018 | Niset | H04L 9/0825 |
| 10,015,159 | B2* | 7/2018 | Toyonaga | H04L 63/0876 |
| 10,193,873 | B2* | 1/2019 | Fahrny | H04L 63/06 |
| 10,404,458 | B1* | 9/2019 | Yamada | H04L 9/0852 |
| 10,439,801 | B2* | 10/2019 | Hu | H04L 63/0869 |
| 10,484,372 | B1* | 11/2019 | Johansson | H04L 63/083 |
| 10,505,741 | B1* | 12/2019 | Conley | H04L 63/123 |
| 10,862,680 | B2* | 12/2020 | Nemiroff | H04L 9/302 |
| 10,872,152 | B1* | 12/2020 | Martel | G06F 21/31 |
| 11,057,196 | B2* | 7/2021 | Schiffman | H04W 76/14 |
| 11,101,993 | B1* | 8/2021 | Shahidzadeh | H04L 9/0863 |
| 11,379,125 | B1* | 7/2022 | Plouchart | G06F 21/76 |
| 11,606,687 | B1* | 3/2023 | Passaglia | H04W 12/61 |
| 11,882,218 | B2* | 1/2024 | Higo | H04L 9/3066 |
| 11,917,058 | B1* | 2/2024 | Garrison Stuber | H04B 3/544 |
| 2002/0053024 | A1* | 5/2002 | Hashimoto | G06F 21/6254 713/168 |
| 2002/0145051 | A1* | 10/2002 | Charrin | G06K 19/077 235/492 |
| 2003/0051140 | A1* | 3/2003 | Buddhikot | H04L 9/0838 713/169 |
| 2003/0172265 | A1* | 9/2003 | Vu | H04L 9/3234 726/9 |
| 2003/0236983 | A1* | 12/2003 | Mihm, Jr. | H04L 63/0876 713/172 |
| 2004/0203591 | A1* | 10/2004 | Lee | H04L 9/0662 455/410 |
| 2005/0060540 | A1* | 3/2005 | Okaue | G11B 20/0021 713/160 |
| 2005/0074122 | A1* | 4/2005 | Fascenda | H04L 63/083 380/258 |
| 2007/0050851 | A1* | 3/2007 | Musha | H04L 9/3236 707/E17.028 |
| 2007/0095927 | A1* | 5/2007 | Pesonen | G06F 21/73 717/136 |
| 2007/0263861 | A1* | 11/2007 | Kiyomoto | H04L 9/0668 380/46 |
| 2008/0027602 | A1* | 1/2008 | Yeap | B60R 25/04 701/31.4 |
| 2008/0175237 | A1* | 7/2008 | Kim | H04W 72/30 370/389 |
| 2008/0255720 | A1* | 10/2008 | Katrak | H04L 12/66 701/32.8 |
| 2009/0089583 | A1* | 4/2009 | Patel | H04L 9/0844 713/171 |
| 2010/0045442 | A1* | 2/2010 | Lu | H04L 9/3271 713/168 |
| 2010/0161966 | A1* | 6/2010 | Kwon | H04L 9/3273 380/278 |
| 2010/0293379 | A1* | 11/2010 | Nie | H04L 9/3242 713/169 |
| 2010/0316217 | A1* | 12/2010 | Gammel | H04L 9/0869 380/44 |
| 2011/0002459 | A1* | 1/2011 | Kim | H04L 63/126 380/28 |
| 2011/0093712 | A1* | 4/2011 | Jin | H04W 12/50 713/171 |
| 2011/0167270 | A1* | 7/2011 | Lee | H04L 9/3242 708/250 |
| 2011/0191586 | A1* | 8/2011 | Jung | H04L 9/3271 |
| 2011/0314279 | A1* | 12/2011 | Ureche | G06F 21/31 713/168 |
| 2012/0011346 | A1* | 1/2012 | Robertson | H04L 63/08 712/42 |
| 2012/0102323 | A1* | 4/2012 | Lin | H04L 9/3271 713/168 |
| 2012/0314867 | A1* | 12/2012 | Tomaru | H04L 9/08 380/270 |
| 2012/0321076 | A1* | 12/2012 | Shah | H04L 9/0897 380/44 |
| 2013/0094452 | A1* | 4/2013 | Pavlovski | H04W 72/51 370/329 |
| 2013/0145177 | A1* | 6/2013 | Cordella | G06F 21/78 713/193 |
| 2014/0006797 | A1* | 1/2014 | Cordella | G06F 12/1408 713/189 |
| 2014/0037093 | A1* | 2/2014 | Park | H04L 9/0894 380/277 |
| 2014/0181901 | A1* | 6/2014 | Markel | H04L 63/08 726/3 |
| 2014/0189359 | A1* | 7/2014 | Marien | H04L 9/3228 713/172 |
| 2014/0223173 | A1* | 8/2014 | Kato | G06F 21/78 713/156 |
| 2014/0258736 | A1* | 9/2014 | Merchan | H04L 9/0866 713/193 |
| 2014/0304810 | A1* | 10/2014 | Khanal | H04L 63/1466 726/22 |
| 2015/0033012 | A1* | 1/2015 | Scarlata | H04L 9/3242 713/161 |
| 2015/0156013 | A1* | 6/2015 | Zhao | H04L 63/08 380/270 |
| 2015/0188704 | A1* | 7/2015 | Takenaka | H04L 9/14 713/171 |
| 2015/0295713 | A1* | 10/2015 | Oxford | H04L 9/3242 713/171 |
| 2015/0341178 | A1* | 11/2015 | Tanaka | H04L 9/0822 713/156 |
| 2015/0350197 | A1* | 12/2015 | Ike | H04L 63/126 713/156 |
| 2015/0379270 | A1* | 12/2015 | Chen | H04L 9/0894 713/2 |
| 2016/0035147 | A1* | 2/2016 | Huang | H04L 9/3271 701/31.4 |
| 2016/0050067 | A1* | 2/2016 | Merchan | H04L 9/0866 713/171 |
| 2016/0057130 | A1* | 2/2016 | Mihaylov | H04L 9/0872 726/8 |
| 2016/0065550 | A1* | 3/2016 | Kanov | H04L 63/061 726/7 |
| 2016/0112206 | A1* | 4/2016 | Cizas | H04L 9/3268 713/158 |
| 2016/0119150 | A1* | 4/2016 | Robison | H04L 63/062 713/158 |
| 2016/0212116 | A1* | 7/2016 | Becker | H04L 9/321 |
| 2016/0350561 | A1* | 12/2016 | Poiesz | G06F 21/53 |
| 2017/0019423 | A1* | 1/2017 | Kotwal | H04L 9/32 |
| 2017/0024584 | A1* | 1/2017 | Chhabra | H04L 9/0861 |
| 2017/0034137 | A1* | 2/2017 | Pillai | H04L 63/0435 |
| 2017/0041302 | A1* | 2/2017 | Oxford | H04L 9/08 |
| 2017/0063544 | A1* | 3/2017 | Oxford | H04L 63/0435 |
| 2017/0070485 | A1* | 3/2017 | Kumar | H04L 9/3066 |
| 2017/0078098 | A1* | 3/2017 | Marquardt | G06F 21/44 |
| 2017/0093567 | A1* | 3/2017 | Gopal | G06F 21/602 |
| 2017/0171754 | A1* | 6/2017 | South | H04W 12/06 |
| 2017/0214662 | A1* | 7/2017 | Chu | H04L 9/0869 |
| 2017/0337390 | A1* | 11/2017 | Hamilton | H04L 9/0861 |
| 2017/0364707 | A1* | 12/2017 | Lal | G06F 13/20 |
| 2018/0063711 | A1* | 3/2018 | Rivera | H04W 12/069 |
| 2018/0076957 | A1* | 3/2018 | Watanabe | G06F 21/602 |

(56) References Cited

U.S. PATENT DOCUMENTS

| | | | |
|---|---|---|---|
| 2018/0241548 A1* | 8/2018 | Dolev | H04L 9/0656 |
| 2018/0316497 A1* | 11/2018 | Kohiyama | H04L 9/0894 |
| 2018/0372878 A1* | 12/2018 | Syrjarinne | H04L 9/3297 |
| 2018/0376329 A1* | 12/2018 | Gapastione | H04W 12/0431 |
| 2019/0042766 A1* | 2/2019 | Pappachan | H04L 9/0819 |
| 2019/0065405 A1* | 2/2019 | Gotze | G06F 12/1408 |
| 2019/0066412 A1* | 2/2019 | Nam | H04L 63/107 |
| 2019/0068361 A1* | 2/2019 | Ye | H04W 4/48 |
| 2019/0126935 A1* | 5/2019 | Phillips | G07C 5/0808 |
| 2019/0158294 A1* | 5/2019 | Smith, III | H04L 9/3226 |
| 2019/0220602 A1* | 7/2019 | Ruan | G06F 21/64 |
| 2019/0236745 A1* | 8/2019 | Kulkarni | H04L 9/0662 |
| 2019/0296911 A1* | 9/2019 | Maki | H04L 9/3226 |
| 2019/0306154 A1* | 10/2019 | Girdhar | H04W 12/065 |
| 2019/0356482 A1* | 11/2019 | Nix | H04W 12/041 |
| 2019/0371104 A1* | 12/2019 | Suleiman | G06F 21/10 |
| 2019/0394177 A1* | 12/2019 | Delightson | H04L 63/0464 |
| 2020/0004933 A1* | 1/2020 | Cocchi | G06F 21/121 |
| 2020/0004970 A1* | 1/2020 | Wang | H04L 63/0876 |
| 2020/0036527 A1* | 1/2020 | Girdhar | H04L 9/0869 |
| 2020/0065112 A1* | 2/2020 | Gotze | G06F 9/3842 |
| 2020/0074088 A1* | 3/2020 | Fu | H04L 9/0897 |
| 2020/0082088 A1* | 3/2020 | Muthukumaran | G06F 21/64 |
| 2020/0084624 A1* | 3/2020 | Lu | H04L 9/14 |
| 2020/0092097 A1* | 3/2020 | Chiu | G06Q 20/3678 |
| 2020/0136819 A1* | 4/2020 | Bae | H04L 9/3066 |
| 2020/0169392 A1* | 5/2020 | Ju | H04L 9/0866 |
| 2020/0344265 A1* | 10/2020 | Kelly | H04L 63/0823 |
| 2020/0344714 A1* | 10/2020 | de la Broise | G06F 7/582 |
| 2020/0382951 A1* | 12/2020 | Lee | H04W 12/037 |
| 2020/0412535 A1* | 12/2020 | Cui | H04L 9/3231 |
| 2021/0037387 A1* | 2/2021 | Kharvar | H04W 40/22 |
| 2021/0044575 A1* | 2/2021 | Kong | H04L 9/3268 |
| 2021/0051483 A1* | 2/2021 | Soryal | B60R 25/24 |
| 2021/0058233 A1* | 2/2021 | Lee | G06Q 20/3678 |
| 2021/0114558 A1* | 4/2021 | Cheng | H04W 12/069 |
| 2021/0119800 A1* | 4/2021 | Jung | H04L 9/3242 |
| 2021/0152345 A1* | 5/2021 | Beloskur | H04L 9/0844 |
| 2021/0183174 A1* | 6/2021 | Wells | G06F 1/325 |
| 2021/0266158 A1* | 8/2021 | Hirschberg | H04L 9/0819 |
| 2021/0286595 A1* | 9/2021 | Huang | G06F 16/27 |
| 2021/0407234 A1* | 12/2021 | Li | G07C 9/00817 |
| 2022/0004627 A1* | 1/2022 | Smith | G06F 21/572 |
| 2022/0006653 A1* | 1/2022 | Ghetie | H04L 63/0428 |
| 2022/0014356 A1* | 1/2022 | Durham | G06F 9/45558 |
| 2022/0014513 A1* | 1/2022 | Neves | H04L 63/0846 |
| 2022/0030426 A1* | 1/2022 | Hofmann | H04W 12/0471 |
| 2022/0057960 A1* | 2/2022 | Boehm | G06F 3/0688 |
| 2022/0085994 A1* | 3/2022 | Feuillette | H04L 9/30 |
| 2022/0103351 A1* | 3/2022 | Cooper | H04L 9/0891 |
| 2022/0113690 A1* | 4/2022 | Seifert | G06Q 50/06 |
| 2022/0116229 A1* | 4/2022 | Jones | H04L 9/3247 |
| 2022/0141026 A1* | 5/2022 | Smith | H04L 9/0891 713/181 |
| 2022/0191689 A1* | 6/2022 | Singh | H04L 63/0428 |
| 2022/0200970 A1* | 6/2022 | Singh | H04L 63/06 |
| 2022/0277088 A1* | 9/2022 | Kim | G06F 21/54 |
| 2022/0294620 A1* | 9/2022 | Jho | G06F 18/214 |
| 2022/0353075 A1* | 11/2022 | Bond | H04L 9/0866 |
| 2022/0382911 A1* | 12/2022 | Morav | G06F 21/33 |
| 2022/0393859 A1* | 12/2022 | Liu | H04L 9/0866 |
| 2023/0004661 A1* | 1/2023 | Choi | G06F 21/602 |
| 2023/0006994 A1* | 1/2023 | Krishna | H04L 63/0838 |
| 2023/0014894 A1* | 1/2023 | M M | H04L 9/0852 |
| 2023/0020730 A1* | 1/2023 | Rasbornig | H04L 9/12 |
| 2023/0023649 A1* | 1/2023 | Sloane | H04W 76/11 |
| 2023/0033630 A1* | 2/2023 | Liu | H04L 9/0825 |
| 2023/0093143 A1* | 3/2023 | Kaidi | G06F 21/31 726/6 |
| 2023/0133441 A1* | 5/2023 | Cosentino | B60R 25/33 340/5.72 |
| 2023/0259638 A1* | 8/2023 | Yang | G06F 21/72 726/26 |
| 2023/0353364 A1* | 11/2023 | Lu | H04L 9/3226 |

* cited by examiner

Ra + Rb = RaRb

IN-VEHICLE NETWORK OTA SECURITY COMMUNICATION METHOD AND APPARATUS, VEHICLE-MOUNTED SYSTEM, AND STORAGE MEDIUM

BACKGROUND OF THE INVENTION

The present disclosure relates to the technical field of automotive panoramic calibration, in particular to an in-vehicle network OTA security communication method and apparatus, a vehicle-mounted system, and a storage medium.

With the development of the Internet of Vehicles, the application of over-the-air (OTA) technology in automobiles is gradually increasing, and automobile enterprises are paying more and more attention to this technology. Since this technology directly rewrites the system version of all ECUs carried in a vehicle, which directly affects the vehicle security, the security protection of the OTA technology is particularly important. Main architectures of OTA is an architecture based on Internet cloud-channel-device and an architecture based on in-vehicle network "cloud-channel-device". The main function of Internet cloud-channel-device is that a vehicle interacts with the cloud through the Internet to download an upgrade package to a master node electronic control unit (ECU) in the vehicle. The in-vehicle network "cloud-channel-device" refers to that the master node ECU is used as the cloud to communicate with each sub ECU with the in-vehicle network communication as a channel, so as to distribute an upgrade package to each sub ECU and rewrites the system version. At present, security protection of the OTA technology mainly focuses on the network information security between the vehicle and the cloud, and the communication security of the in-vehicle network is almost still in a "streaking" state. With the rapid development of in-vehicle Ethernet, in-vehicle communication is getting faster and faster, and there are more and more communication protocol selections of a business layer. OTA is also developing from a traditional in-vehicle CAN bus to the in-vehicle Ethernet architecture, and more and more data and information are rapidly transmitted between various ECUs based on the in-vehicle network, so the problem about data security needs to be solved urgently.

At present, OTA achieves communication mainly based on the in-vehicle Ethernet and the in-vehicle controller area network (CAN) bus. There is no identity authentication function for the master node and each child node before communication, and all service interaction data, such as upgrade package distribution, upgrade commands and upgrade progress, are transmitted in plain text without being encrypted, so illegal OTA activities may be performed if the master node or each child node is attacked, which affects vehicle security.

BRIEF SUMMARY OF THE INVENTION

The present disclosure provides an in-vehicle network OTA security communication method and apparatus, a vehicle-mounted system, and a storage medium in order to overcome at least one of the defects (shortcomings) in the prior art.

In order to solve the above-mentioned technical problems, the present disclosure adopts the following technical solutions.

In a first aspect, the present disclosure provides an in-vehicle network OTA security communication method. The method is applied to a vehicle-mounted system. The vehicle-mounted system includes a main processor and a sub-processor, a root key being preset in the main processor, a root key seed or root key being preset in the sub-processor, and the main processor being in transmission connection to the outside to acquire an upgrade package online or offline. The method includes:

sending a communication request to the sub-processor, and receiving a first random number generated by the sub-processor and a check code generated based on the first random number and a root key;

after the check code is verified to be correct, generating a second random number, concatenating the second random number and the first random number into a random number set, and sending to the sub-processor the random number set and a check code generated based on the random number set and the root key;

after receiving information that the verification by the sub-processor succeeds, deriving a temporary communication key on the basis of the random number set for encrypted communication with the sub-processor, and issuing an upgrade package to the sub-processor; and after the upgrade package is sent, ending a session and invalidating the temporary key.

Further, the check code is an MAC value, and the MAC value is a check value obtained by MAC calculation of random number data based on an MAC algorithm and the root key.

Further, the concatenation of random numbers is formed by the way that the first random number and the second random number form a data set in parallel.

Further, the deriving a temporary communication key on the basis of the random number set for encrypted communication with the sub-processor, and issuing an upgrade package to the sub-processor includes:

requesting, by the sub-processor, the upgrade package from the main processor;

returning, by the main processor, the upgrade package to the sub-processor based on the upgrade package acquired by external transmission; and after download is completed, sending, by the sub-processor, a completion signal to the main processor, where transmission of the session adopts the temporary communication key derived from the random number set for encrypted communication.

Further, the after the upgrade package is sent, ending a session and invalidating the temporary key specifically includes:

after the upgrade package completes upgrade, sending, by the sub-processor, a session Final identifier to the main processor to invalidate the temporary key, and in a case of a new subsequent upgrade task, generating a new temporary key to encrypt communication data.

Further, the main processor acquires the upgrade package by downloading online from a cloud or offline from a USB port.

Further, a verification method of the check code includes:

acquiring the random number data;

calculating a check code through the random number data based on the root key; and determining whether the calculated check code matches the check code in the message, where when the two check codes match, the check code passes the verification, otherwise, the check code fails the verification.

where the check code is an MAC value.

In a second aspect, the present disclosure provides an in-vehicle network OTA security communication apparatus. The communication apparatus includes a main processor, and the main processor is in communication connection with a sub-processor in a vehicle-mounted system through the in-vehicle network OTA security communication method described above, so as to send an upgrade package to the sub-processor.

In a third aspect, the present disclosure provides a vehicle-mounted system. The vehicle-mounted system includes a sub-processor and the in-vehicle network OTA security communication apparatus described above.

In a fourth aspect, the present disclosure further provides a storage medium having a computer program stored thereon. The computer program, when executed by a processor, implements the steps of the in-vehicle network OTA security communication method described above.

According to the present disclosure, the temporary key is generated through the random numbers and the root key in the in-vehicle network, integrity check is performed with the MAC value, the master node and each child node of the in-vehicle network need to be subjected to identity authentication before performing OTA service, and the OTA service may be started only after the authentication succeeds. During the service process, data that needs to be exchanged between the master node and each child node, including various commands, upgrade package content, upgrade progress transmission and other data, may be encrypted, the key for each encryption is randomly generated, and the OTA service is different each time, thereby avoiding key leakage and replay attacks, ensuring the security of in-vehicle network OTA communication, and improving the security of the vehicle-mounted system.

DETAILED DESCRIPTION OF THE INVENTION

In order to make the objects, technical solutions and advantages of the present disclosure more clear, the present disclosure is further described in detail below with reference to the accompanying drawings and the embodiments. It is to be understood that the specific embodiments described herein are merely illustrative of the present disclosure, and are not intended to limit the present disclosure.

The same or similar numbers in the accompanying drawings of the embodiments of the present application correspond to the same or similar components. In the description of the present application, it should be understood that the terms "upper", "lower", "left", "right", "top", "bottom", "inside", "outside", etc. indicate orientations or positional relationships based on the orientations or positional relationships shown in the accompanying drawings, and are merely for the convenience of describing the present application and simplifying the description, rather than indicating or implying that the referred devices or components must have a specific orientation, be constructed and operated in a specific orientation, so the terms describing the positional relationship in the accompanying drawings are for illustrative purposes merely and should not be construed as limitations on the patent.

In addition, the terms "first", "second", etc. are used for descriptive purposes merely, primarily to distinguish between different devices, components or parts (specific types and configurations may be the same or different), not to indicate or imply relative importance and number of the referred devices, components or parts, and thus they should not be construed as indicating or implying relative importance.

Embodiment 1

Vehicle OTA is the process of rewriting and updating the system version of each ECU of a vehicle based on an in-vehicle network. In view of the current communication status that communication of the in-vehicle network almost has no security measure, a method in this embodiment is mainly used to prevent a system of each ECU from being tampered with and rewritten at will.

Figure 1:
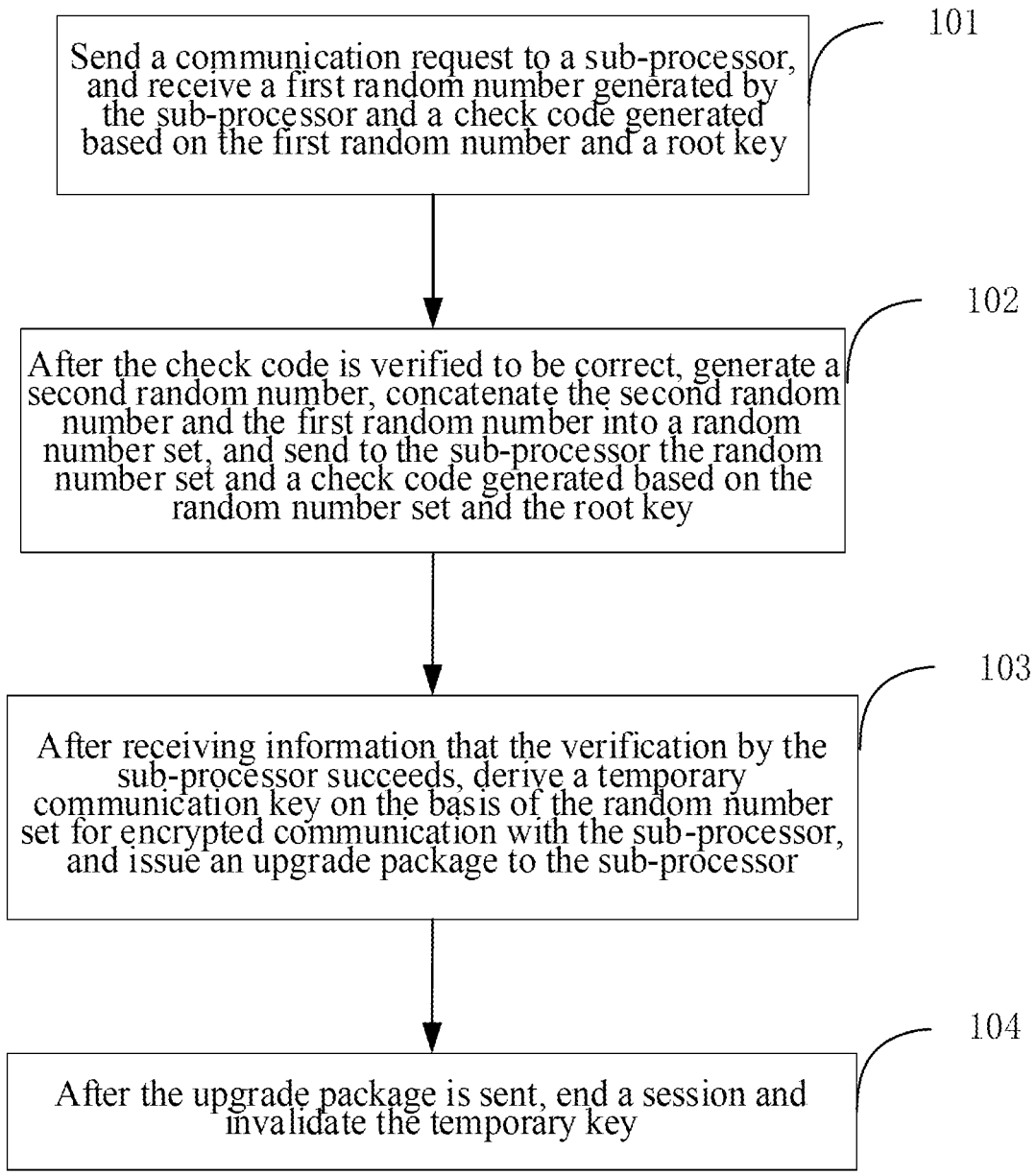
FIG. 1 is a structure flow diagram of an in-vehicle network OTA security communication method according to an embodiment of the present disclosure.

FIG. 1 shows a structure flow diagram of an in-vehicle network OTA security communication method in this embodiment.

As shown in FIG. 1, this embodiment provides an in-vehicle network OTA security communication method. The method is applied to a vehicle-mounted system and mainly used to realize the information communication between a main processor and a sub-processor in an in-vehicle network, mainly to improve security protection of the OTA technology of the vehicle, and to prevent a master node or child nodes from being attacked during the distribution and transmission of an upgrade package in the in-vehicle network and being utilized externally for illegal OTA activities, which affects vehicle security.

Specifically, this solution is based on the vehicle-mounted system. The vehicle-mounted system specifically includes the main processor and the sub-processor. A root key is preset in the main processor, and a root key seed or root key is preset in the sub-processor. If the root key seed is used, the root key needs to be generated through the root key seed. Specifically, the root key may be preset in a security chip, a security partition, or a common partition as required. More specifically, the main processor is in transmission connection to the outside to acquire an upgrade package online or offline. The method in this embodiment utilizes the main processor to perform the following steps:

101: Send a communication request to the sub-processor, and receive a first random number generated by the sub-processor and a check code generated based on the first random number and the root key.

102: After the check code is verified to be correct, generate a second random number, concatenate the second random number and the first random number into a random number set, and send to the sub-processor the random number set and a check code generated based on the random number set and the root key.

103: After receiving information that the verification by the sub-processor succeeds, derive a temporary communication key on the basis of the random number set for encrypted communication with the sub-processor, and issue an upgrade package to the sub-processor.

104: After the upgrade package is sent, end a session and invalidate the temporary key.

When the sub-processor needs to acquire the upgrade package, the communication request between the sub-processor and the main processor is performed, and the sub-processor and the main processor generate the temporary key through the generated random numbers and the preset root key.

As described in steps 101, 102 and 103, a specific generation method for the temporary key is as follows: the main processor and the sub-processor generate the random numbers respectively, acquire the random number set obtained by concatenating the two random numbers respectively through two transfers, and use the random number set to form the temporary key.

In the transmission process of the random numbers, in order to prevent the random numbers from being hijacked and tampered with, the check code is used for verification in this embodiment. The check code in this embodiment is a media access control address (MAC) value. Specifically, a sending end calculates an MAC value by using random numbers during sending, and sends the MAC value to a receiving end; after receiving data, the receiving end calculates an MAC value by using the preset root key; and if the MAC value is incorrect, it may be known that the data has been tampered with, thereby achieving verification.

After the temporary key is determined, the main processor and the sub-processor use the temporary key for communication during subsequent upgrade sessions of the upgrade package, the temporary key is invalidated after the upgrade package is sent, and a temporary key is regenerated in the case of subsequent sessions, thereby ensuring the security of the subsequent sessions and preventing key leakage and replay attacks.

As a premise, the main processor may acquire the upgrade package by downloading online from a cloud or offline from a USB port.

Some preferred solutions in this embodiment are provided below.

Preferably, the check code in this embodiment adopts the MAC value, and the MAC value is a check value obtained by MAC calculation of random number data based on an MAC algorithm and the root key. After the session communication is hijacked, the MAC value may change, which thus may be used as a check.

Preferably, the concatenation of the random numbers is formed by the way that the first random number and the second random number form a data set in parallel. For example, if the first random number is Ra and the second random number is Rb, the random number set formed after concatenation is RaRb.

Preferably, the deriving a temporary communication key on the basis of the random number set for encrypted communication with the sub-processor, and issuing an upgrade package to the sub-processor in step 103 includes:

201: Request, by the sub-processor, the upgrade package from the main processor.

202: Return, by the main processor, the upgrade package to the sub-processor based on the upgrade package acquired by external transmission.

203: Upon completion of download, send, by the sub-processor, a completion signal to the main processor.

Transmission of the session adopts the temporary communication key derived from the random number set for encrypted communication.

In the above steps, the main processor may be divided into a file transfer protocol (FTP) service terminal and a cloud communication terminal. The FTP service terminal is similar to an FTP server, so that the sub-processor may download an upgrade package file from the main processor through the FTP. The cloud communication terminal is responsible for communicating with the cloud, and is responsible for downloading upgrade files of all processors from the cloud to the main processor, and then each sub-processor downloads a corresponding upgrade package file from the main processor through the FTP.

In the above request for the upgrade package, the sub-processor requests the upgrade package to the FTP service terminal of the main processor through the temporary key, receives the upgrade package when the main processor returns the upgrade package, and returns a download success signal after successful download to end the session.

Preferably, the after the upgrade package is sent, ending a session and invalidating the temporary key in step 104 specifically includes:

after the upgrade package completes upgrade, send, by the sub-processor, a session Final identifier to the main processor to invalidate the temporary key, and in the case of a new subsequent upgrade task, generate a new temporary key to encrypt communication data.

Specifically, after obtaining the upgrade package, the sub-processor starts upgrade; after upgrade is completed, an upgrade completion message is encrypted with the temporary key, and carries a completion identifier to be sent to the main processor to invalidate the temporary key; and in the case of a new subsequent upgrade task, a new temporary key is regenerated to encrypt the communication data.

Preferably, in the method of this embodiment, a verification method of the check code includes:

301: Acquire the random number data.

302: Calculate a check code through the random number data based on the root key.

303: Determine whether the calculated check code matches the check code in the message. When the two check codes match, the check code passes the verification, otherwise, the check code fails the verification.

The check code is the MAC value.

In the above verification method, the main function of the MAC value is integrity check. If the transmitted message is hijacked and tampered with in a communication channel, the receiving end may find that the MAC value is incorrect by calculating an MAC value with the preset root key after receiving the data, so it may be known that the data has been tampered with, thereby achieving verification.

Figure 2:
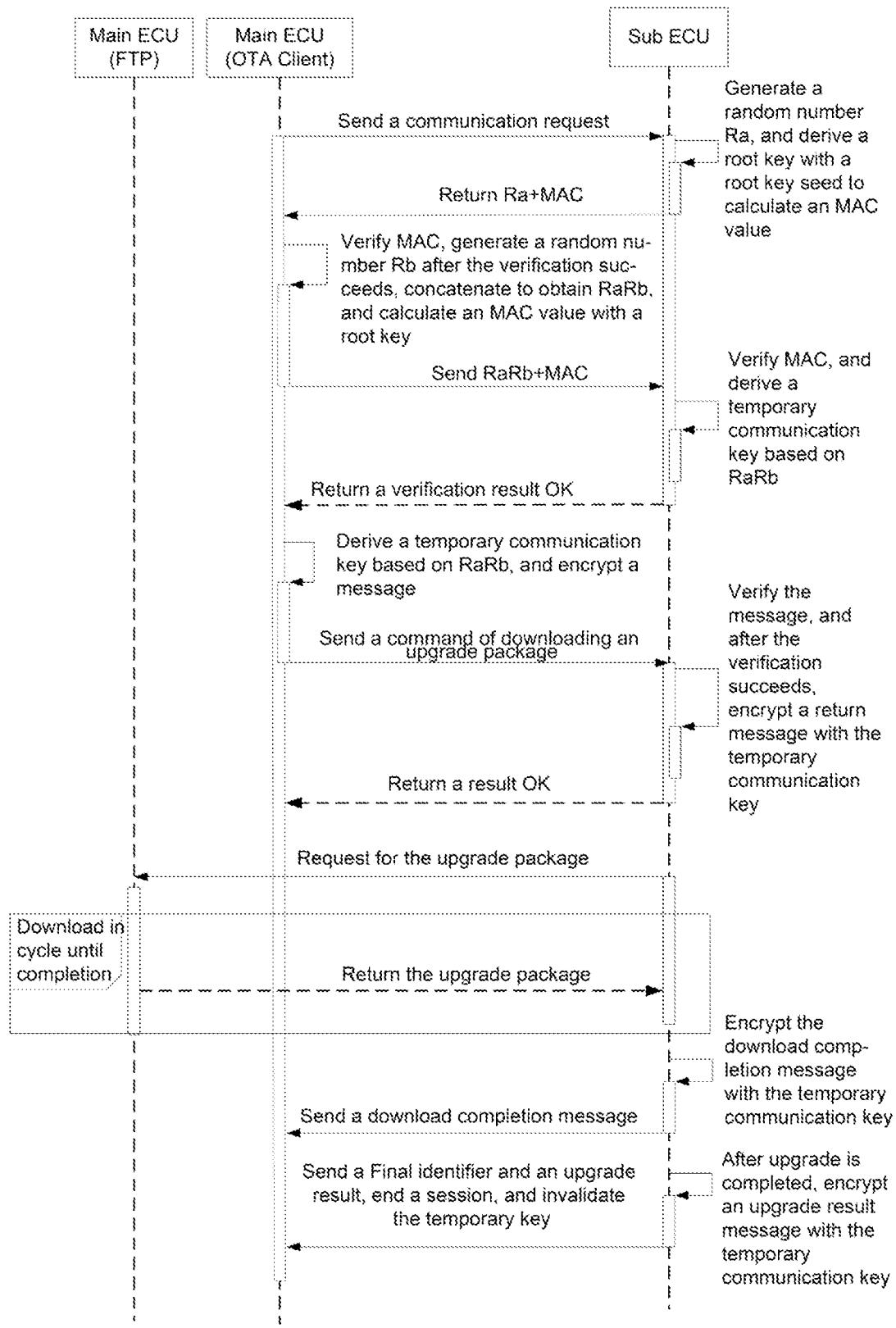
FIG. 2 is a flow diagram of a specific implementation of an in-vehicle network OTA security communication method according to an embodiment of the present disclosure.

For better operational experience, this embodiment provides a specific implementation. as shown in FIG. 2. In FIG. 2, a main ECU indicates the main processor in this embodiment, and a sub ECU indicates the sub-processor in this embodiment. The specific steps are as follows:

As a premise, firstly, before the upgrade package is transferred:

the root key is preset in the main processor, and the root key seed or root key is preset in the sub-processor. The root key may be preset in a security chip, a security partition, or a common partition, depending on the actual situation. Secondly, the upgrade package may be downloaded to the main processor online, or may be transferred to the main processor offline by means of USB and the like.

During transfer of the upgrade package:

S1: After the upgrade package for the sub-processor is prepared, the main processor sends the communication request to the sub-processor.

Figures 3, 4:
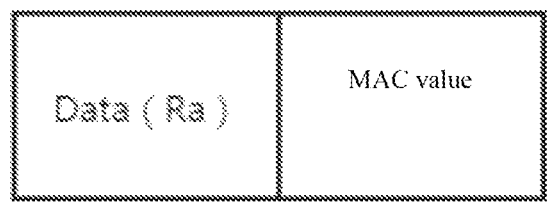
FIG. 3 is a diagram of a data transmission package structure according to an embodiment of the present disclosure.
FIG. 4 is a schematic diagram of concatenation of random numbers according to an embodiment of the present disclosure.

S2: After receiving the communication request, the sub-processor generates the first random number Ra, the root key is generated based on the root key seed through a key derivation algorithm, for example, a key derivation function (KDF) algorithm, and then the MAC value of the message sent to the main processor is calculated through the MAC algorithm. A final message data structure is as shown in FIG. 3, where Data includes the random number Ra and other customized communication data fields, and the MAC value is a value obtained by MAC calculation of Data based on the MAC algorithm and the root key.

S3: The main processor verifies the message sent by the sub-processor: Data (Ra) is acquired, an MAC value is calculated based on the root key, and finally compared with the MAC value in the message, if the two values are the same, it indicates that the verification succeeds, and if the values are different, it indicates that the verification fails.

S4: After the verification succeeds, the main processor generates the random number Rb and concatenates Ra and Rb. A concatenation model is as shown in FIG. 4 below. After the concatenation is completed, an MAC value of Data (RaRb) is calculated with the root key and then sent to the sub-processor.

S5: The sub-processor verifies the message sent by the main processor based on the principle of step 3, obtains the random number RaRb after the verification succeeds, and returns a message that the verification succeeds to the main processor. In this way, both the main processor and the sub-processor have the random number RaRb, and encryption temporary keys used for subsequent communication all use the temporary key derived from the random number RaRb.

6: After obtaining the message that the verification succeeds, the main processor encrypts a message requesting the sub-processor to download the upgrade package with the temporary key derived from RaRb, and sends the message to the sub-processor. The sub-processor decrypts the message with the temporary key derived from RaRb to obtain a download address of the upgrade package and other information, encrypts a message "OK" with the temporary key, and returns the message to the main processor.

7. The sub-processor sends a request for downloading the upgrade package to the FTP service terminal of the main processor based on the download address of the upgrade package, and the main processor returns the upgrade package to the sub-processor in a cycle until the download of the upgrade package is completed.

8. After completing the download, the sub-processor encrypts a download completion message with the temporary key and sends the message to the main processor.

9. After obtaining the upgrade package, the sub-processor starts upgrade; after the upgrade is completed, an upgrade completion message is encrypted with the temporary key and carries the Final identifier to be sent to the main processor to invalidate the temporary key; and in the case of a new subsequent upgrade task, a new temporary key is regenerated to encrypt the communication data.

This embodiment has the following advantages: by means of the security communication method, the temporary key is generated through the random numbers and the root key in the in-vehicle network, integrity check is performed with the MAC value, the master node and each child node of the in-vehicle network need to be subjected to identity authentication before performing OTA service, and the OTA service may be started only after the authentication succeeds. During the service process, data that needs to be exchanged between the master node and each child node, including various commands, upgrade package content, upgrade progress transmission and other data, may be encrypted, the key for each encryption is randomly generated, and the OTA service is different each time, thereby avoiding key leakage and replay attacks, ensuring the security of in-vehicle network OTA communication, and improving the security of the vehicle-mounted system.

Embodiment 2

This embodiment provides an in-vehicle network OTA security communication apparatus. The communication apparatus includes a main processor, and the main processor may be in communication connection with a sub-processor in a vehicle-mounted system and send to the sub-processor an upgrade package acquired online from a cloud or offline via a USB port.

The main processor communicates with the sub-processor in the vehicle-mounted system by generating a temporary key through random numbers. During specific communication, the communication apparatus uses the main processor to perform the following steps:

send a communication request to the sub-processor, and receive a first random number generated by the sub-processor and a check code generated based on the first random number and a root key;

after the check code is verified to be correct, generate a second random number, concatenate the second random number and the first random number into a random number set, and send to the sub-processor the random number set and a check code generated based on the random number set and the root key;

after receiving information that the verification by the sub-processor succeeds, derive a temporary communication key on the basis of the random number set for encrypted communication with the sub-processor, and issue an upgrade package to the sub-processor; and after the upgrade package is sent, end a session and invalidate the temporary key.

Preferably, in this embodiment, the main processor communicates with the sub-processor in the vehicle-mounted system through the in-vehicle network OTA security communication method in Embodiment 1.

The security communication apparatus completes security communication of an in-vehicle network by generating the temporary key and using the key to encrypt the upgrade package for communication, thereby effectively improving the security of the in-vehicle network of a vehicle.

Embodiment 3

This embodiment provides a vehicle-mounted system. The vehicle-mounted system includes a sub-processor and the in-vehicle network OTA security communication apparatus in Embodiment 2. The sub-processor in the vehicle-mounted system and the main processor in the security communication apparatus generate a temporary key through random numbers, and have a session with the temporary key, thereby ensuring the security of in-vehicle network OTA communication.

Embodiment 4

This embodiment provides a storage medium having a computer program stored thereon. The computer program, when executed by a processor, may implement the steps of the in-vehicle network OTA security communication method in Embodiment 1.

Apparently, the above embodiments of the present disclosure are only examples of the present disclosure for purposes of clarity and are not intended to limit the implementations of the present disclosure. Changes or modifications in other different forms may also be made by a person of ordinary skill in the art on the basis of the above description. All implementations need not to be, and cannot be, exhaustive. Any modifications, equivalent replacements, improvements, etc. made within the spirit and principle of the present disclosure shall fall within the scope of protection of the claims of the present disclosure.

What is claimed is:

1. An in-vehicle network OTA security communication method, applied to a vehicle-mounted system, the vehicle-mounted system comprising a main processor and a sub-processor, a root key being preset in the main processor, a root key seed or root key being preset in the sub-processor, and the main processor being in transmission connection to the outside to acquire an upgrade package online or offline; and the method comprising:

sending a communication request to the sub-processor, and receiving a first random number generated by the sub-processor and a check code generated based on the first random number and the root key;

after the check code is verified to be correct, generating a second random number, concatenating the second random number and the first random number into a random number set, and sending to the sub-processor the random number set and a check code generated based on the random number set and the root key;

after receiving information that verification by the sub-processor succeeds, deriving a temporary communication key on the basis of the random number set for encrypted communication with the sub-processor, and issuing an upgrade package to the sub-processor; and after the upgrade package is sent, ending a session and invalidating the temporary key.

2. The in-vehicle network OTA security communication method according to claim 1, wherein the check code is an MAC value, and the MAC value is a check value obtained by MAC calculation of random number data based on an MAC algorithm and the root key.

3. The in-vehicle network OTA security communication method according to claim 1, wherein the concatenation of random numbers is formed by the way that the first random number and the second random number form a data set in parallel.

4. The in-vehicle network OTA security communication method according to claim 1, wherein the deriving a temporary communication key on the basis of the random number set for encrypted communication with the sub-processor, and issuing an upgrade package to the sub-processor comprises:

requesting, by the sub-processor, the upgrade package from the main processor;

returning, by the main processor, the upgrade package to the sub-processor based on the upgrade package acquired by external transmission; and after download is completed, sending, by the sub-processor, a completion signal to the main processor, wherein transmission of the session adopts the temporary communication key derived from the random number set for encrypted communication.

5. The in-vehicle network OTA security communication method according to claim 1, wherein the after the upgrade package is sent, ending a session and invalidating the temporary key specifically comprises:

after the upgrade package completes upgrade, sending, by the sub-processor, a session Final identifier to the main processor to invalidate the temporary key, and in a case of a new subsequent upgrade task, generating a new temporary key to encrypt communication data.

6. The in-vehicle network OTA security communication method according to claim 1, wherein the main processor acquires the upgrade package by downloading online from a cloud or offline from a USB port.

7. The in-vehicle network OTA security communication method according to claim 1, wherein a verification method of the check code comprises:

acquiring the random number data;

calculating a check code through the random number data based on the root key; and determining whether the calculated check code matches the check code in the message, wherein when the two check codes match, the check code passes the verification, otherwise, the check code fails the verification, wherein the check code is an MAC value.

8. An in-vehicle network OTA security communication apparatus, wherein the communication apparatus comprises a main processor, and the main processor is in communication connection with a sub-processor in a vehicle-mounted system through the in-vehicle network OTA security communication method according to claim 1, so as to send an upgrade package to the sub-processor.

9. A storage medium having a computer program stored thereon, wherein the computer program, when executed by a processor, implements the steps of the in-vehicle network OTA security communication method according to claim 1.

* * * * *